United States Patent
Vijaykeerthy et al.

(10) Patent No.: US 11,636,331 B2
(45) Date of Patent: Apr. 25, 2023

(54) USER EXPLANATION GUIDED MACHINE LEARNING

(71) Applicant: International Business Machines Corporation, Armonk, NY (US)

(72) Inventors: Deepak Vijaykeerthy, Bangalore (IN); Philips George John, Kottayam (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 16/506,413

(22) Filed: Jul. 9, 2019

(65) Prior Publication Data

US 2021/0012156 A1    Jan. 14, 2021

(51) Int. Cl.
*G06N 3/08* (2023.01)
*G06N 20/00* (2019.01)
(Continued)

(52) U.S. Cl.
CPC .......... *G06N 3/08* (2013.01); *G06F 18/214* (2023.01); *G06N 3/045* (2023.01); *G06N 3/084* (2013.01);
(Continued)

(58) Field of Classification Search
CPC .... G06K 9/6256; G06N 3/0454; G06N 3/084; G06N 20/00; G06N 3/08; G06N 5/045;
(Continued)

(56) References Cited

U.S. PATENT DOCUMENTS 9,330,315 B2   5/2016  Fan et al.
9,971,763 B2   5/2018  Abdel-Reheem et al.
(Continued)

FOREIGN PATENT DOCUMENTS

WO    2017213398 A1    12/2017

OTHER PUBLICATIONS

Anirudh, Rushil, et al. Influential sample selection: A graph signal processing approach. No. LLNL-CONF-738534. Lawrence Livermore National Lab.(LLNL), Livermore, CA (United States), 2017 (Year: 2017).*

(Continued)

*Primary Examiner* — Maurice L. McDowell, Jr.
(74) *Attorney, Agent, or Firm* — Ryan, Mason & Lewis, LLP (57) ABSTRACT

Methods, systems, and computer program products for active explanation guided learning are provided herein. A computer-implemented method includes identifying a subset of training examples, from a set of training examples, based on at least one of (i) an uncertainty metric computed for each one of the training examples and (ii) an influence metric computed for each one of the training examples; outputting said subset of training examples to a user; obtaining, from the user, a user explanation for each training example in said subset of training examples, wherein each of the user explanations identifies at least one part of the corresponding training example; and training a machine learning model based at least in part on the user explanations, wherein said training comprises prioritizing the identified parts of the training examples in the subset.

20 Claims, 6 Drawing Sheets

(51) Int. Cl.
*G06T 7/11* (2017.01)
*G06N 3/084* (2023.01)
*G06F 18/214* (2023.01)
*G06N 3/045* (2023.01)

(52) U.S. Cl.
CPC ............... *G06N 20/00* (2019.01); *G06T 7/11* (2017.01); *G06T 2207/20081* (2013.01); *G06T 2207/20084* (2013.01)

(58) Field of Classification Search
CPC . G06N 3/045; G06T 7/11; G06T 2207/20081; G06T 2207/20084; G06F 18/214
See application file for complete search history.

(56) References Cited

U.S. PATENT DOCUMENTS

| | | |
|---|---|---|
| 10,044,944 B2 | 8/2018 | Adsumilli et al. |
| 2010/0250473 A1* | 9/2010 | Porikli ............... G06N 20/10 706/20 |
| 2011/0119208 A1* | 5/2011 | Kirshenbaum ......... G06N 5/02 706/54 |
| 2019/0244122 A1* | 8/2019 | Li ........................ G06N 20/00 |
| 2019/0279111 A1* | 9/2019 | Merrill ................. G06N 20/20 |
| 2019/0354810 A1* | 11/2019 | Samel .................... G06N 3/04 |
| 2020/0242398 A1* | 7/2020 | Gudovskiy ............ G06V 10/82 |
| 2020/0294231 A1* | 9/2020 | Tosun ................ G06V 20/698 |
| 2020/0410355 A1* | 12/2020 | Zhu ....................... G06Q 10/04 |
| 2021/0012211 A1* | 1/2021 | Sikka ..................... G06N 3/10 |
| 2021/0012897 A1* | 1/2021 | Katuwal ............... G06N 5/003 |

OTHER PUBLICATIONS

Cook, R. D., & Weisberg, S., Residuals and Influence in Regression, 1982, Chapman and Hall, New York.

Selvaraju et al., Grad-cam: Visual explanations from deep networks via gradient-based localization, Proceedings of the IEEE International Conference on Computer Vision, 2017, pp. 618-626.

Koh et al., Understanding black-box predictions via influence functions, Proceedings of the 34th International Conference on Machine Learning—vol. 70, Aug. 6, 2017, pp. 1885-1894, JMLR.org.

Gal et al., Dropout as a bayesian approximation: Representing model uncertainty in deep learning, International Conference on Machine Learning, Jun. 11, 2016, pp. 1050-1059.

* cited by examiner

USER EXPLANATION GUIDED MACHINE LEARNING

FIELD

The present application generally relates to information technology and, more particularly, to training machine learning models.

BACKGROUND

In general, Machine Learning (ML) models learn by ingesting training examples. Since a user is responsible for curating and providing the training data, the ML model's predictions are susceptible to the user's biases. In image classification, for example, when a ML model is trained with data that include training examples where a foreground object incidentally commonly occurs with the same background object, then the trained ML model often focuses on the background of the object which adversely affects the generalization performance of the model (i.e., the ability of the ML model to generalize to new data). Additionally, it is not always clear how to rebalance training data to avoid user biases.

SUMMARY

In one embodiment of the present invention, techniques for explanation guided learning are provided. An exemplary computer-implemented method includes identifying a subset of training examples, from a set of training examples, based on at least one of (i) an uncertainty metric computed for each one of the training examples and (ii) an influence metric computed for each one of the training examples; outputting said subset of training examples to a user; obtaining, from the user, a user explanation for each training example in said subset of training examples, wherein each of the user explanations identifies at least one part of the corresponding training example; and training a machine learning model based at least in part on the user explanations, wherein said training comprises prioritizing the identified parts of the training examples in the subset.

An example of another embodiment of the subject matter described herein includes a computer-implemented method, the method including training a machine learning model on a dataset for one or more iterations, wherein the dataset comprises one or more training examples; obtaining, from a user, one or more user explanations for a subset of said training examples, wherein the user explanations identify one or more areas of importance for each of the subset of training examples in the subset; and re-training the machine learning model for one or more additional iterations on said dataset, wherein said re-training comprises at least (i) generating machine explanations for the subset of training examples that quantify an influence of different parts of a given one of the training examples on outputs of the machine learning model, (ii) comparing the user explanations to the machine explanations, and (iii) adjusting a parameter configuration of the machine learning model based on said comparing.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Example embodiments herein describe techniques for active explanation guided learning that, for example, help address biases when training a ML model. At least one example embodiment provides a scheme that forces a ML model to focus on objects holistically instead of the background, by providing minimal feedback to the ML model based on explanations. As used herein, the term 'explanation' refers to information relating to the inner workings of an ML model, such as an activation map, for example. Some techniques for generating explanations include, for example, Class Activation Mapping (CAM) and Gradient-weighted Class Activation Mapping (Grad-CAM), which quantify the influence of each pixel in an image on the outputs of the model.

At least one example embodiment herein automatically identifies a subset of a set of training examples to seek feedback for building a benchmark set of explanations. This makes it more efficient to identify useful explanations, which is often computationally expensive and labor intensive.

Figure 1:
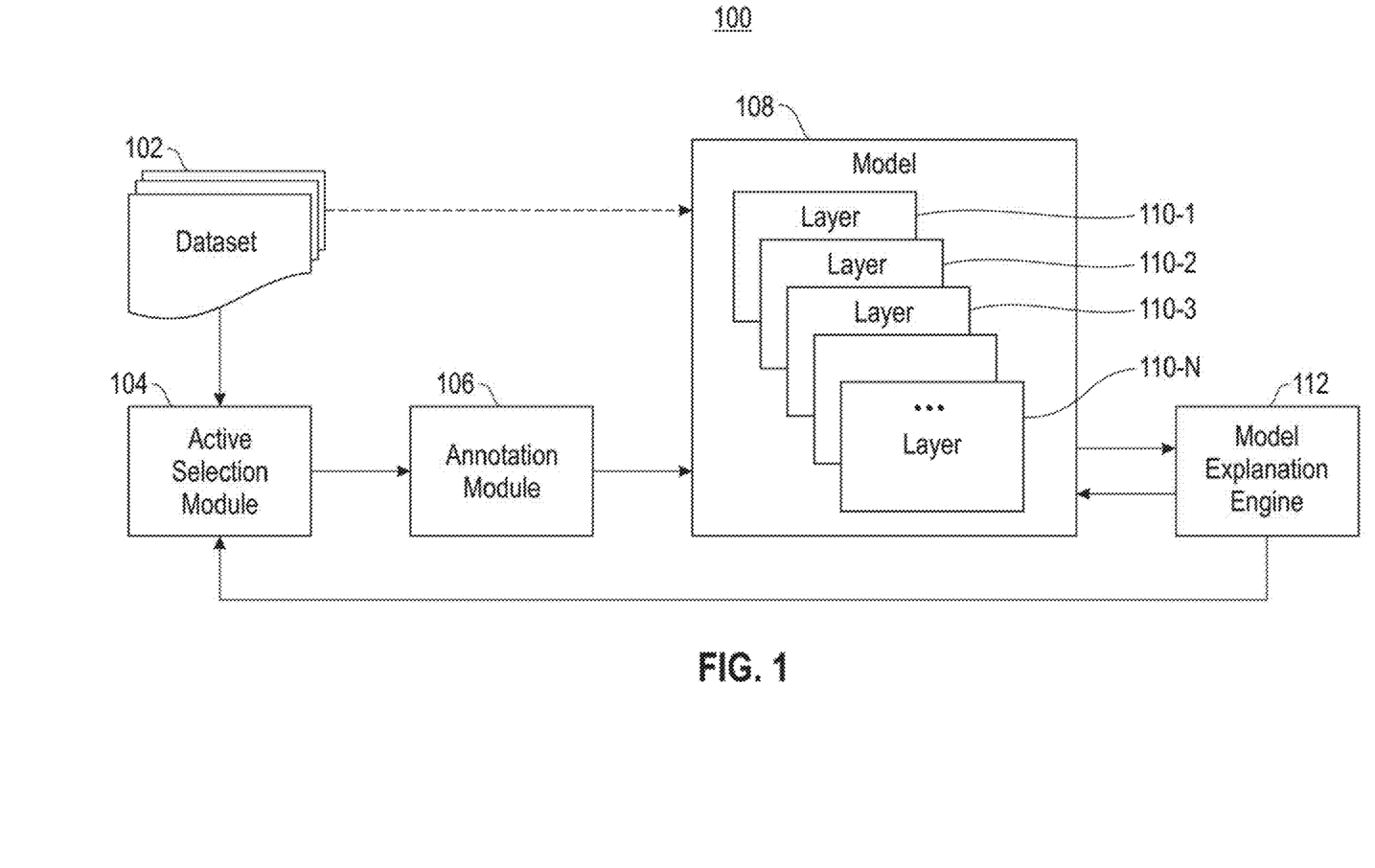
FIG. 1 is a diagram illustrating system architecture, according to an exemplary embodiment of the invention.

Referring now to FIG. 1, a high-level block diagram illustrating a system architecture 100 according to an example embodiment is depicted. The architecture 100 includes an active selection module 104, an annotation module 106, a model 108, and a model explanation engine 112.

The active selection module 104 obtains a dataset 102 comprising a set of training examples (e.g., a set of images) that are provided to the model 108 as part of a training process. In the example shown in FIG. 1, the model 108 includes a plurality of layers 110-1, 110-2, 110-3 . . . 110-N (referred to collectively as layers 110). The layers 110 may include for example, an input layer, an output layer, and one or more hidden layers (e.g., convolutional layer(s), pooling layer(s), ReLU (Rectified Linear Unit) layer(s), fully connected layer(s), etc.). Although the description below generally refers to the model as being a neural network model for classifying images, it is to be appreciated that the teachings herein are generally applicable to other machine learning models, such as machine learning models for classification, clustering, regression, ranking, etc.

During training, the model explanation engine 112 computes machine explanations based on the parameter configuration of the model 108 at the current iteration of training. The active selection module 104 obtains the explanations and identifies a subset of training examples from the dataset 102 for which to seek additional supervision. Annotation module 106 generates user explanations for the identified training examples. For example, the annotation module 106 may output each of the identified training examples (e.g., the training image) to a user (e.g., via a graphical user interface), and the user may then provide a user explanation by annotating the training example. As an example, the user explanation may include one or more bounding boxes or a segmentation map. The user explanations may then be incorporated in future training iterations when training the model 108 as described in more detail herein.

As such, the architecture 100 provides, for example, a mechanism to reduce bias in machine learning models by identifying a subset of training examples for which to seek additional supervision, and incorporates that additional supervision during the training process to improve the resultant explanations.

Figure 2A:
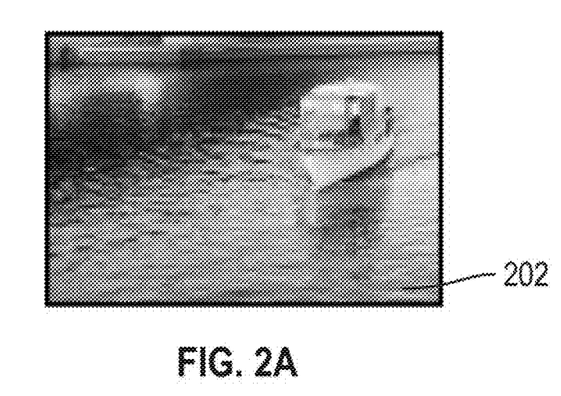
FIG. 2A shows an example of training data in the form of an image in accordance with example embodiments of the subject matter described herein.

Referring now to FIG. 2A, this figure shows an example of training data in the form of an image 202 in accordance with example embodiments. For example, the image 202 may correspond to a training example in the dataset 102 for training the model to identify boats.

Figure 2B:
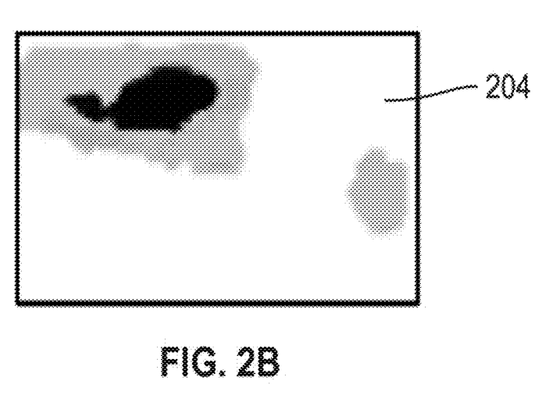
FIG. 2B shows an activation map corresponding to the image in FIG. 2A in accordance with an example embodiment of the subject matter described herein.

FIG. 2B shows an activation map 204 for a machine learning model when the model is presented with image 202. As can be seen from activation map 204, the model focused on the background of the image as represented by the shaded regions. The model was less focused (i.e., fewer activations) on the portion of the image corresponding to the boat as indicated by the white region of the activation map 204.

Figure 2C:
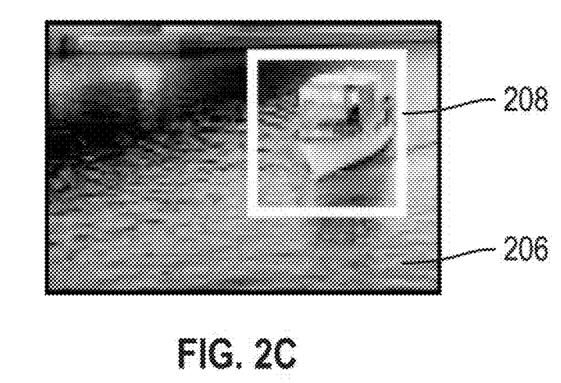
FIG. 2C shows an explanation of the image in FIG. 2A in accordance with an example embodiment of the subject matter described herein.

FIG. 2C shows an example of a user explanation 206 of the image 202. The user explanation 206 may correspond to the output of annotation module 106 in FIG. 1, for example. In the example shown in FIG. 2C, the image 202 has been annotated (e.g., via user input) so that a box 208 is placed around the boat in the image 202. The box 208 may thus cause the model to focus on the relevant parts of the image 202, which in this example are the subset of pixels corresponding to the boat.

Figure 2D:
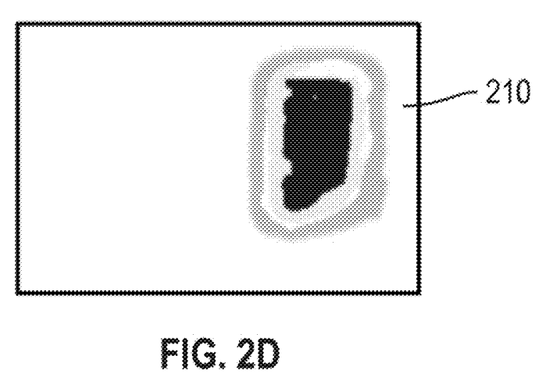
FIG. 2D shows an improved activation map in accordance with an example embodiment of the subject matter described herein.

FIG. 2D shows an improved activation map 210 resulting from the user explanation 206 of the image 202. In contrast to activation map 204, the model was strongly focused on the portion of the image 202 corresponding to the boat (and box 208). Since the improved activation map 210 has undergone additional scrutiny (e.g., via user provided feedback), it is used as a benchmark in one or more example embodiments. Accordingly, the term benchmark refers to an explanation that has undergone increased supervision.

It is noted that FIGS. 2A-2D are merely examples, and is to be appreciated that the training example, annotation, and/or explanations could take other forms depending on the implementation (e.g., the type of model). For example, the input dataset may be in the form of text, and the annotation may cause the model to focus on a subset of words in a given input text, and the annotations may be provided using any suitable type of user input, or combination thereof, such as audio, text, drawings, etc.

According to at least one example embodiment, given a set of training examples D and a set $E \subset D$ for which explanations are available, additional supervision from the set E is incorporated by using additional terms in the loss function. This encourages the model to focus on the relevant parts of the training example (e.g., an image). For example, the loss function may be expressed as: $L_c + L_e + L_a$, wherein $L_c$ is classification loss, $L_e$ is explanation loss, and $L_a$ is attention loss. For example, $L_c$ is typically categorical cross entropy for the case of deep neural networks (DNNs). $L_a$ attempts to reduce the attention score. For example, in case of object classification, $L_c$ assures that the regions beyond the highly discriminative parts of the image do not trigger the model to recognize the object. The attention score may be computed by taking the explanation from the model with the current set of model parameters, masking the regions corresponding to the explanation and then computing loss for the inverted image obtained as described above, for example. $L_e$ is the explanation loss which ensures that the explanations from the updated model (i.e., the model obtained after re-training) match the explanations provided by, for example, a user.

At each epoch of training, the explanation is computed at the current parameter configuration and used to refine the model. Additionally, the model is forced to shift its focus to align with the user explanations.

In one or more example embodiments, the feedback is incorporated using trainable explanations. As an example, assume explanations are obtained via a Grad-CAM technique, then one way to incorporate the feedback is as follows:

- Let $f_{l,k}$ be the activation map for $l^{th}$ filter on the $k^{th}$, the gradient of the classification loss for each class c with respect to the activation maps, these are then passed to a Global Activation Pooling layer to obtain neuron importance weights $w_{l,k}^c$.
- $w^c$ is then used as a kernel for 2D Convolutional Layer (2D Conv) over the activation maps, followed by ReLU layer, which helps backpropagate the error in the explanations and in turn refine the explanations from the model.

By way of example, for convolutional neural networks (CNNs) (which are typically used for image classification), additional loss (i.e., explanation loss ($L_e$)) may be based on the Mean Squared Error between the benchmark explanations (e.g., user-provided explanations) and activation maps; and for feed-forward classification networks, the additional loss may be based on the KL-divergence between the logits for the original input and the benchmark explanation.

A subset of examples may be chosen (e.g., during the training process) for additional supervision explanations after training the model on a given dataset for a number of iterations. Trainable explanations (e.g., based on Grad-CAM as described above) are used at a given epoch, as well as measures of influence and uncertainty, to choose the subset S of training examples (in a single iteration). The selected subset of training examples are then presented to a user for annotation (e.g., by a human expert).

According to at least one example embodiment, the measure of influence in selecting the subset of training examples is based at least in part on Influence Functions. In particular, a set of candidate points C (e.g., the subset of training examples identified by the active selection module in FIG. 1, for example) is determined based at least in part on the influence of each point x in the training set on the model's prediction via influence functions, and then choosing the top k points based on their influence towards change in model's prediction in the validation set. Influence functions help explain, for example, how a model's predictions are affected (i) when a point from the training set is omitted, (ii) when a point in the training set is perturbed, or (iii) when a set of additional points are added to the training set. As such, these influence functions help quantify the importance of each point in the training set. Additional information on techniques relating to Influence Functions may be found in Cook, R. D. and Weisberg, S., *Residuals and Influence in Regression*. New York: Chapman and Hall, 1982, which is hereby incorporated by reference. The use of influence functions allows examples that are most likely to affect the model's predictions to be selected for additional supervision.

Techniques for computing influence functions are usually prone to error due to approximations. To alleviate this issue, one or more example embodiments compute multiple candidate sets from different architectures for the same task to obtain an aggregated candidate set.

According to at least one example embodiment, selecting the subset of training examples may also be based at least in part on the measure of uncertainty. The notion of a model's predictive uncertainty quantifies the noise in training data as well as captures the model's lack of knowledge, and thus quantifies how uncertain a model is about its predictions. When selecting the subset of examples, points with high uncertainty may be considered, since these are the points where the predictions are possibly of a low quality, and thus may be the most improved by adding the extra information via annotations in the training loop. The uncertainty may be determined, for example, using neural network models that provide various measures of uncertainty as an output, in addition to classification scores.

Additionally, we should also consider the machine explanations as a prior when defining uncertainty. This is straightforward when the explanation itself is trainable (e.g., some form of trainable attention or Grad-CAM). Then, the scores of the network can be interpreted as a conditional probability with the explanation (attention) itself as a prior. Some possible measures of uncertainty for a classification task are (where the logits give the conditional probabilities), for example:

Predictive entropy ($H(y | x, D_{train})$): −

$$\Sigma_c p(y = c | x, D_{train}) \log p(y = c | x, D_{train})$$

Variation ratio: $1 - \max_y p(y | x, D_{train})$ wherein 'y' is the class label of the given example, 'x' is the feature vector (e.g., RGB values for each pixel), '$D_{train}$' is the training set, 'c' refers to the particular value from the label set (e.g., if the label set is {yes, no}, the predictive entropy is obtained by summing over the individual entropies of 'y=yes' and 'y=no').

Based on the above, a non-limiting example of an algorithm that can be used for identifying a set of candidate points S is as follows:

1. Suppose at most k data points are to be selected for annotation.
2. Train a model on a basic dataset for M epochs and find the attention-based explanation (e.g., heat map) $E^I$ for each point (e.g., image) I (at the last epoch) is obtained.
3. Threshold the heat map $E^I$ (find the regions where $E_{ij}^I \geq t$ for some appropriate t) and mask (e.g., gray-out) these important regions. Let the masked image be $I^M$.
4. Choose the top-k images I such that the corresponding masked image $I^M$ has the highest influence on the model. Let this set be $S_{in} = \{I_1^{in}, \ldots, I_k^{in}\}$.
5. Alternatively or additionally, choose the top-k images I with the highest prediction uncertainty. Let this set be $S_{un} = \{I_1^{un}, \ldots, I_k^{un}\}$.
6. Choose the sets $S_{in}$, $S_{un}$ or a combination of both, for additional supervision.

The model may then be retrained using the trainable explanation-guided loss, which guides the model to focus on the actual important regions (indicated by the annotated explanation) while learning.

Figure 3:
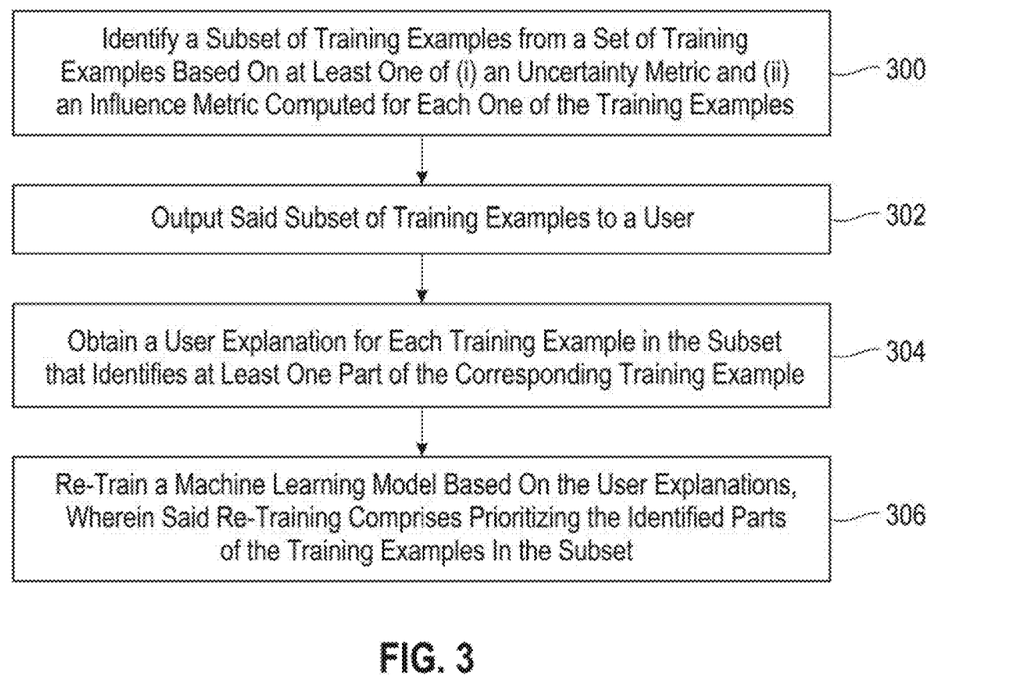
FIG. 3 is a flow diagram illustrating techniques according to an embodiment of the invention.

FIG. 3 is a flow diagram illustrating techniques according to an embodiment of the present invention. Step 300 includes identifying a subset of training examples, from a set of training examples, based on at least one of (i) an uncertainty metric computed for each one of the training examples and (ii) an influence metric computed for each one of the training examples. Step 302 includes outputting said subset of training examples to a user. Step 304 includes obtaining, from the user, a user explanation for each training example in said subset of training examples, wherein each of the user explanations identifies at least one part of the corresponding training example. Step 306 includes training a machine learning model based at least in part on the user explanations, wherein said training comprises prioritizing the identified parts of the training examples in the subset.

The training may include generating, after each of one or more iterations of training, a machine explanation for at least each training example within the subset, wherein each of the machine explanations quantify influence of different parts of the corresponding training example on outputs of the machine learning model. The training may include minimizing a loss function, the loss function comprising one or more of: a classification loss parameter that is based at least in part on entropy of different classes of the training examples in said set of training examples; and an explanation loss parameter that is used to adjust the machine learning model, wherein the explanation loss parameter is based at least in part on a comparison of the user explanations and the machine explanations after a given one of the iterations of training. The comparison of the user explanations and the machine explanations may include at least one of: (i) a Mean Squared Error computation and (ii) KL-divergence computation. The machine explanations may include activation maps generated by at least one of: a class activation mapping (CAM) process and a Gradient-weighted Class Activation Mapping (Grad-CAM) process. Identifying the subset of the training examples may include thresholding activation maps that correspond to a particular parameter configuration of the machine learning model, thereby masking important regions in the activation maps; and computing the influence metric based at least in part on said thresholding. The identifying may be based on a combination of the uncertainty metrics and influence metrics. The subset of training examples may be limited to a predefined number that is less than the total number of training examples in the set. The model may include one of (i) a feed-forward neural network and (ii) convolutional neural network. Each training example in the set may include one of (i) an image and (ii) text.

An example of another embodiment of the subject matter described herein includes a computer-implemented method comprising training a machine learning model on a dataset for one or more iterations, wherein the dataset comprises one or more training examples; obtaining, from a user, one or more user explanations for a subset of said training examples, wherein the user explanations identify one or more areas of importance for each of the subset of training examples in the subset; and re-training the machine learning model for one or more additional iterations on said dataset, wherein said re-training comprises at least (i) generating machine explanations for the subset of training examples that quantify an influence of different parts of a given one of the training examples on outputs of the machine learning model, (ii) comparing the user explanations to the machine explanations, and (iii) adjusting a parameter configuration of the machine learning model based on said comparing.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
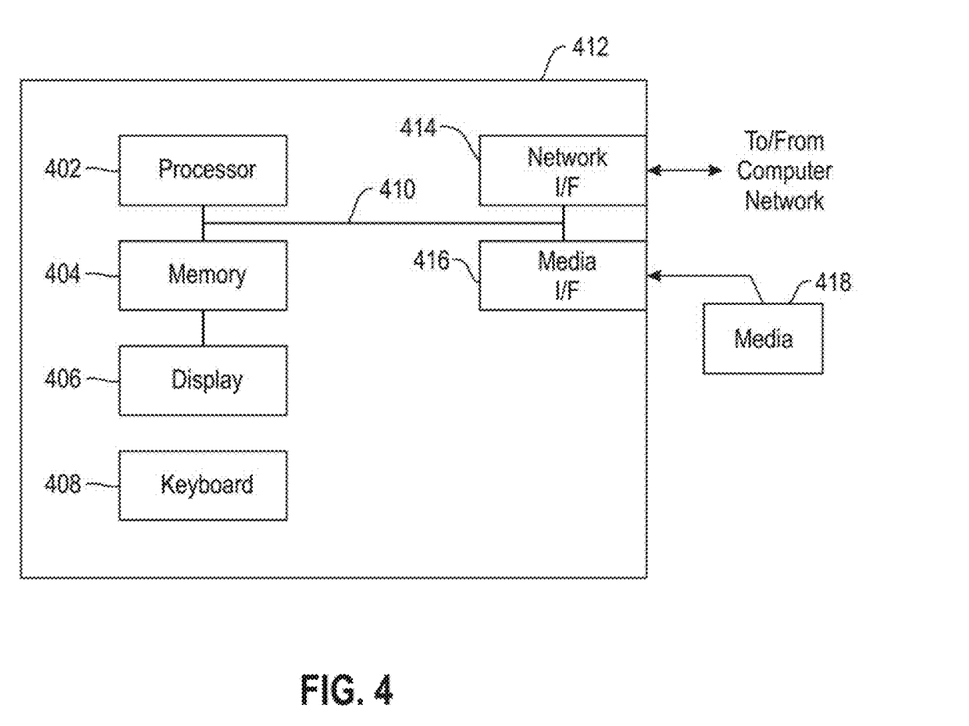
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
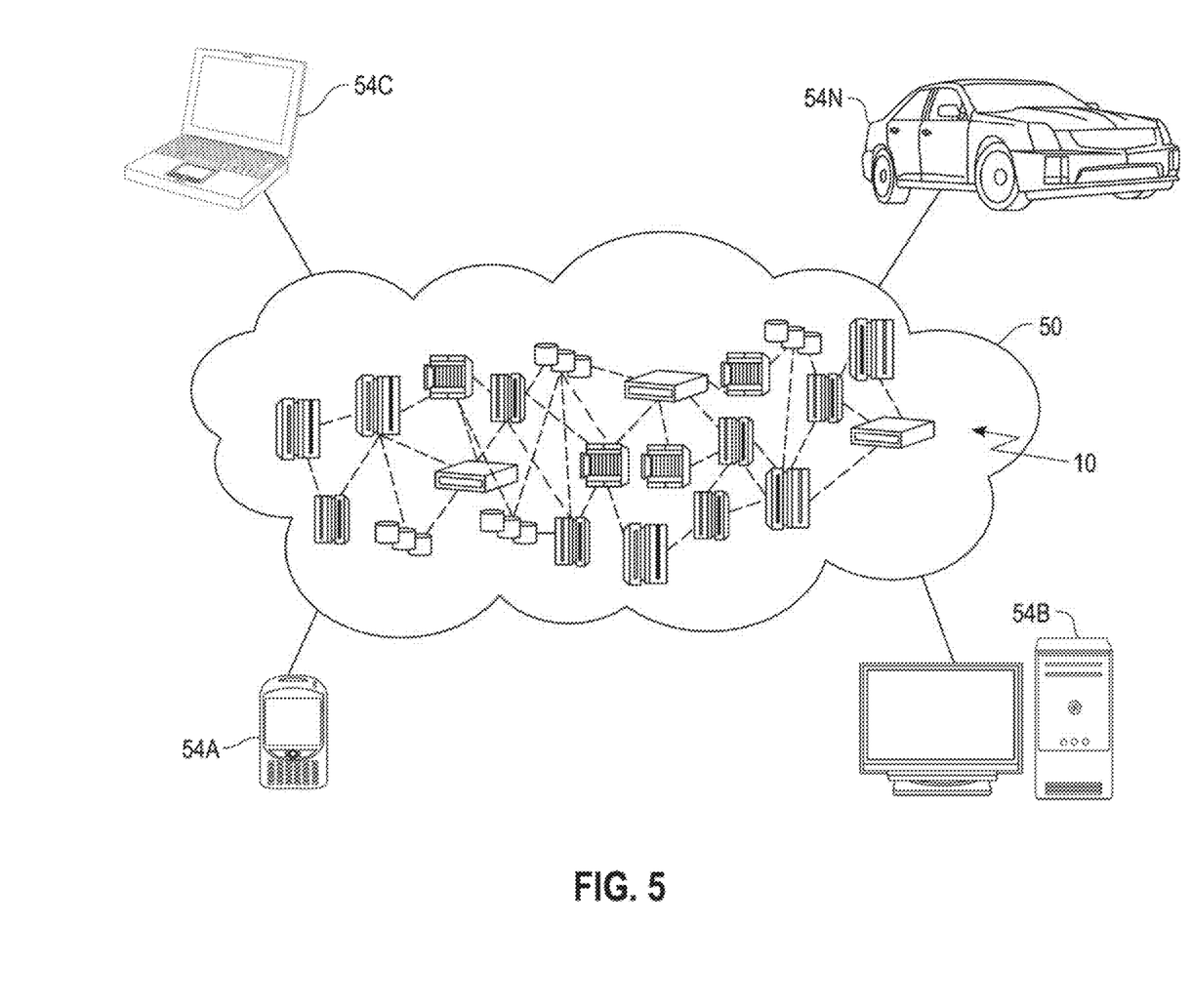
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
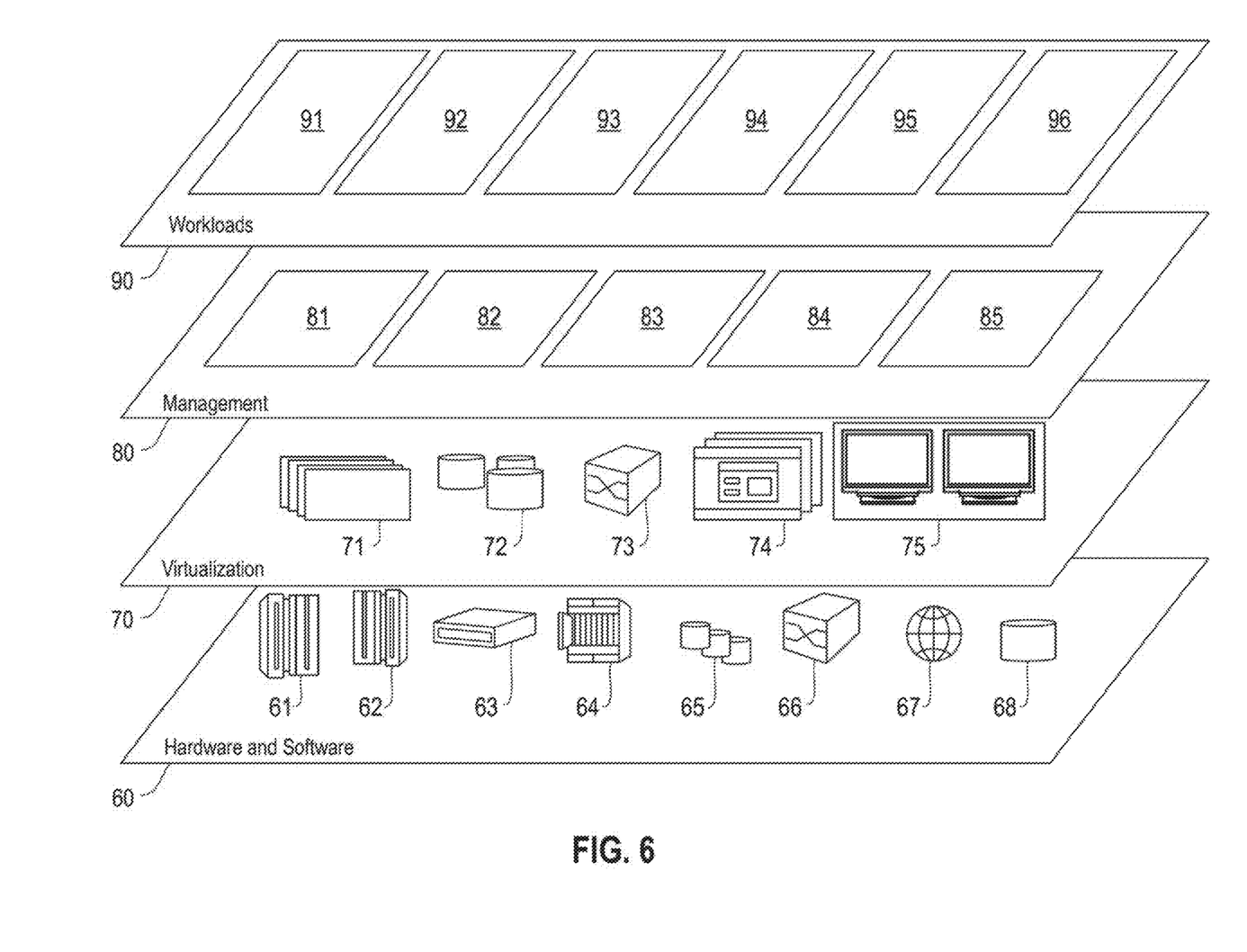
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and explanation guided learning 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide beneficial effects such as, for example, one or more of: forcing classifiers to focus on an object holistically rather than on the background, allowing explanations to be supervised during training time, and identifying an optimal subset of training points for which to provide supervision to improve the model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    identifying a subset of training examples, from a set of training examples, based on at least one of an uncertainty metric computed for each one of the training examples and an influence metric computed for each one of the training examples, wherein the number of training examples in the subset of training examples is limited to a specified number that is less than the total number of training examples in the set;
    outputting said subset of training examples to a user;
    obtaining, from the user, a user explanation for each training example in said subset of training examples, wherein each of the user explanations identifies at least one part of the corresponding training example; and
    training a machine learning model based at least in part on the user explanations, wherein said training comprises prioritizing the identified parts of the training examples in the subset;
    wherein the method is carried out by at least one computing device.

2. The computer-implemented method of claim 1, wherein said training comprises:
    generating, after each of one or more iterations of training, a machine explanation for at least each training example within the subset, wherein each of the machine explanations quantifies influence of different parts of the corresponding training example on outputs of the machine learning model.

3. The computer-implemented method of claim 2, wherein said training comprises minimizing a loss function, the loss function comprising one or more of:
    a classification loss parameter that is based at least in part on entropy of different classes of the training examples in said set of training examples; and
    an explanation loss parameter that is used to adjust the machine learning model, wherein the explanation loss parameter is based at least in part on a comparison of the user explanations and the machine explanations after a given one of the iterations of training.

4. The computer-implemented method of claim 3, wherein the comparison of the user explanations and the machine explanations comprises at least one of: a Mean Squared Error computation and a KL-divergence computation.

5. The computer-implemented method of claim 2, wherein the machine explanations comprise activation maps generated by at least one of: a class activation mapping process and a Gradient-weighted Class Activation Mapping process.

6. The computer-implemented method of claim 1, wherein said identifying the subset of the training examples comprises:
    thresholding activation maps that correspond to a particular parameter configuration of the machine learning model, thereby masking important regions in the activation maps; and
    computing the influence metric based at least in part on said thresholding.

7. The computer-implemented method of claim 1, wherein said identifying is based on a combination of the uncertainty metrics and influence metrics.

8. The computer-implemented method of claim 1, wherein the model comprises one of a feed-forward neural network and convolutional neural network.

9. The computer-implemented method of claim 1, wherein each training example in the set comprises one of an image and text.

10. A computer program product comprising a computer readable storage medium having program instructions embodied therewith, the program instructions executable by a computing device to cause the computing device to:
identify a subset of training examples, from a set of training examples, based on at least one of an uncertainty metric computed for each one of the training examples and an influence metric computed for each one of the training examples, wherein the number of training examples in the subset of training examples is limited to a specified number that is less than the total number of training examples in the set;
output said subset of training examples to a user;
obtain, from the user, a user explanation for each training example in said subset of training examples, wherein each of the user explanations identifies at least one part of the corresponding training example; and
train a machine learning model based at least in part on the user explanations, wherein said training comprises prioritizing the identified parts of the training examples in the subset.

11. The computer program product of claim 10, wherein said training comprises:
generating, after each of one or more iterations of training, a machine explanation for at least each training example within the subset, wherein each of the machine explanations quantifies influence of different parts of the corresponding training example on outputs of the machine learning model.

12. The computer program product of claim 11, wherein said training comprises minimizing a loss function, the loss function comprising one or more of:
a classification loss parameter that is based at least in part on entropy of different classes of the training examples in said set of training examples; and
an explanation loss parameter that is used to adjust the machine learning model, wherein the explanation loss parameter is based at least in part on a comparison of the user explanations and the machine explanations after a given one of the iterations of training.

13. The computer program product of claim 12, wherein the comparison of the user explanations and the machine explanations comprises at least one of: a Mean Squared Error computation and a KL-divergence computation.

14. The computer program product of claim 11, wherein the machine explanations comprise activation maps generated by at least one of: a class activation mapping process and a Gradient-weighted Class Activation Mapping process.

15. The computer program product of claim 10, wherein said identifying the subset of the training examples comprises:
thresholding activation maps that correspond to a particular parameter configuration of the machine learning model, thereby masking important regions in the activation maps; and
computing the influence metric based at least in part on said thresholding.

16. The computer program product of claim 10, wherein said identifying is based on a combination of the uncertainty metrics and influence metrics.

17. A system comprising:
a memory; and
at least one processor operably coupled to the memory and configured for:
identifying a subset of training examples, from a set of training examples, based on at least one of an uncertainty metric computed for each one of the training examples and an influence metric computed for each one of the training examples, wherein the number of training examples in the subset of training examples is limited to a specified number that is less than the total number of training examples in the set;
outputting said subset of training examples to a user;
obtaining, from the user, a user explanation for each training example in said subset of training examples, wherein each of the user explanations identifies at least one part of the corresponding training example; and
training a machine learning model based at least in part on the user explanations, wherein said training comprises prioritizing the identified parts of the training examples in the sub set.

18. The system of claim 17, wherein said training comprises:
generating, after each of one or more iterations of training, a machine explanation for at least each training example within the subset, wherein each of the machine explanations quantifies influence of different parts of the corresponding training example on outputs of the machine learning model.

19. The system of claim 17, wherein said identifying the subset of the training examples comprises:
thresholding activation maps that correspond to a particular parameter configuration of the machine learning model, thereby masking important regions in the activation maps; and
computing the influence metric based at least in part on said thresholding.

20. A computer-implemented method, the method comprising:
training a machine learning model on a dataset for one or more iterations, wherein the dataset comprises one or more training examples;
obtaining, from a user, one or more user explanations for a subset of said training examples, wherein the user explanations identify one or more areas of importance for each of the subset of training examples in the subset; and
re-training the machine learning model for one or more additional iterations on said dataset, wherein said re-training comprises at least generating machine explanations for the subset of training examples that quantify an influence of different parts of a given one of the training examples on outputs of the machine learning model, comparing the user explanations to the machine explanations, and adjusting a parameter configuration of the machine learning model based on said comparing.

* * * * *